(12) United States Patent
Massal

(10) Patent No.: US 9,834,304 B2
(45) Date of Patent: Dec. 5, 2017

(54) ROTORCRAFT ROTOR HAVING A FLAPPING ABUTMENT MECHANISM, AND A ROTORCRAFT

(71) Applicant: AIRBUS HELICOPTERS, Marignane (FR)

(72) Inventor: Fabien Massal, Saint Chamas (FR)

(73) Assignee: Airbus Helicopters, Marignane (FR)

( * ) Notice: Subject to any disclaimer, the term of this patent is extended or adjusted under 35 U.S.C. 154(b) by 379 days.

(21) Appl. No.: 14/608,656

(22) Filed: Jan. 29, 2015

(65) Prior Publication Data

US 2015/0217864 A1  Aug. 6, 2015

(30) Foreign Application Priority Data

Jan. 31, 2014  (FR) ...................................... 14 00271

(51) Int. Cl.
  *B64C 27/32* (2006.01)
  *B64C 27/35* (2006.01)
(52) U.S. Cl.
  CPC ............ *B64C 27/322* (2013.01); *B64C 27/35* (2013.01)
(58) Field of Classification Search
  None
  See application file for complete search history.

(56) References Cited

U.S. PATENT DOCUMENTS

| 2,629,452 | A | * | 2/1953 | Alex | ....................... B64C 27/54 |
| | | | | | 416/106 |
| 2,719,593 | A | * | 10/1955 | Alex | ..................... B64C 27/322 |
| | | | | | 416/140 |
| 4,342,540 | A | | 8/1982 | Lovera et al. | |
| 4,652,210 | A | | 3/1987 | Leman et al. | |
| 4,737,075 | A | | 4/1988 | Leman et al. | |

FOREIGN PATENT DOCUMENTS

| EP | 1371554 | 12/2003 |
| FR | 2447856 | 8/1980 |
| FR | 2551723 | 3/1985 |
| FR | 2584997 | 1/1987 |
| FR | 2735094 | 12/1996 |
| GB | 2073121 | 10/1981 |

OTHER PUBLICATIONS

French Search Report for FR 1400271, Completed by the French Patent Office on Oct. 21, 2014, 7 Pages.

* cited by examiner

*Primary Examiner* — Jessica Cahill
*Assistant Examiner* — Daphne M Barry
(74) *Attorney, Agent, or Firm* — Brooks Kushman P.C.

(57) ABSTRACT

A rotor carrying a plurality of lift assemblies, each having a retention and mobility member. An abutment mechanism of a lift assembly includes an abutment track arranged on the retention and mobility member and a single cylindrical abutment that is movable in pivoting about a movement axis, said abutment extending over a height in elevation and also over a length and over a width. The length is greater than said width, and said height is greater than said length. A fly-weight is secured to pivot with said abutment, and a return spring exerts a force on said fly-weight.

20 Claims, 3 Drawing Sheets

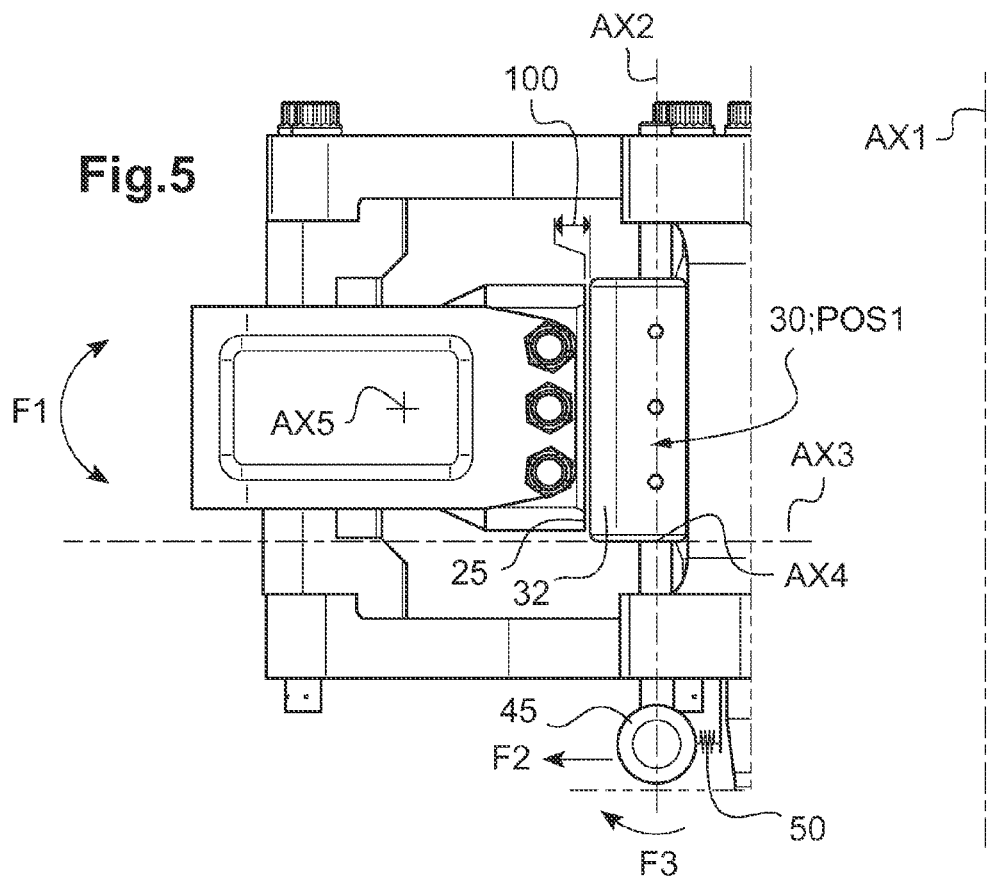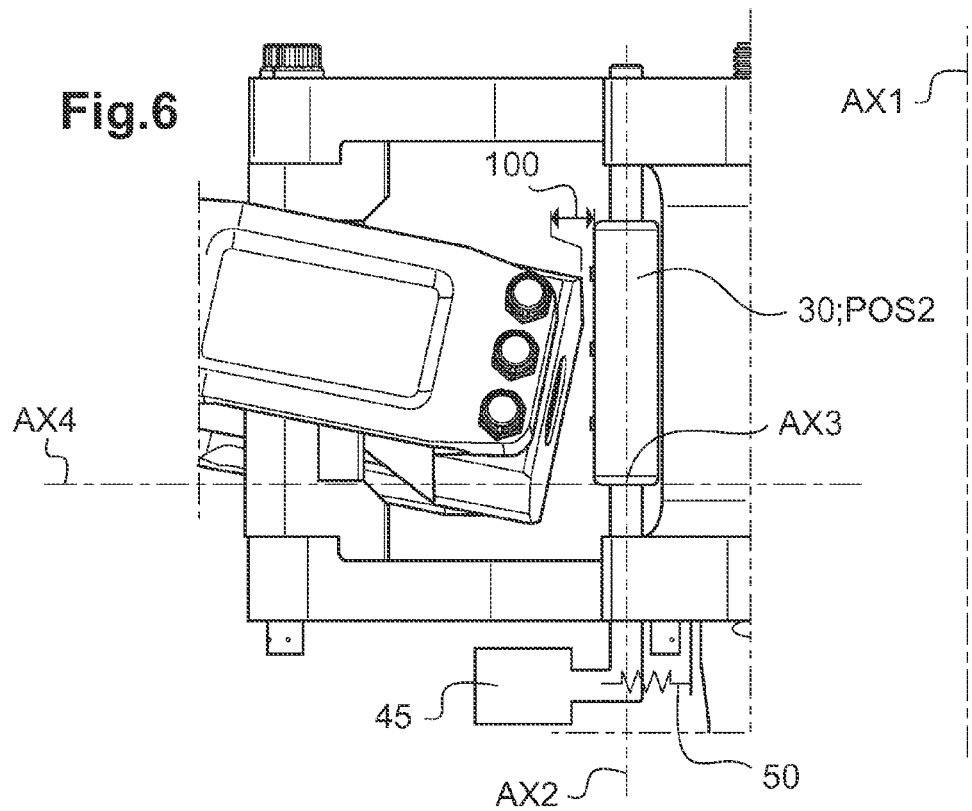

ROTORCRAFT ROTOR HAVING A FLAPPING ABUTMENT MECHANISM, AND A ROTORCRAFT

CROSS REFERENCE TO RELATED APPLICATION

This application claims priority to French patent application No. FR 14 00271 filed on Jan. 31, 2014, the disclosure of which is incorporated in its entirety by reference herein.

BACKGROUND OF THE INVENTION (1) Field of the Invention

The present invention relates to a rotorcraft rotor, and to a rotorcraft having such a rotor.

The invention thus lies in the technical field of rotorcraft rotors. More specifically, the invention lies in the field of abutments fitted to such rotors in order to limit the flapping movement of lift elements carried by the rotor.

(2) Description of Related Art

A rotorcraft usually includes at least one rotor for providing it with at least part of its lift and possibly also with its propulsion.

A rotor has a hub that is set into rotation by a mast. The hub then carries at least two lift assemblies. Consequently, each lift assembly comprises a blade connected to the hub via at least one retention and mobility member. Each blade may in particular comprise a lift element fastened to a cuff or a lift element having an incorporated cuff.

By way of example, a retention and mobility member includes a hinge referred to as a "spherical abutment". Each spherical abutment may have one strength member fastened to the hub, and another strength member fastened to a cuff, regardless of whether the cuff is or is not incorporated in a lift element.

The blades are thus substantially plane elongate elements, each carried at one end by the hub, and extending transversely to the axis of rotation of the hub. The blades are mounted on the hub by individual mounting members for mounting the blades on the hub, which members include retention and mobility members for connecting the lift assemblies to the hub.

The hub may be a hub having a plurality of plates comprising two plates that are secured to a mast. For example, each retention and mobility member may have one strength member fastened to the plates by means of a pin.

In another embodiment, the hub may have a single plate secured to the mast, with the plate being provided with radial arms including openings. A retention and mobility member is optionally positioned in each opening, being secured to the plate by one of its strength members. A cuff then extends on either side of the plate going from the retention and mobility member to a lift element.

The mounting members are fitted respectively to each of the blades at their roots in order to enable the blades to be maneuvered by an operator. Mounting the blades movably on the hub makes it possible for a rotorcraft pilot to cause the pitch of the blades to vary collectively or cyclically in flight in order to influence the behavior of the rotorcraft with respect to its lift and/or its propulsion.

The freedom of the blades to move relative to the hub allows them to perform lead/lag movements, pitch variation movements, and up and down flapping movements. The concepts of up and down should be considered relative to the direction in which the axis of rotation of the rotor extends. When the rotor is rotating at nominal speed, the blades are spontaneously driven upwards under the effects of centrifugal force and of lift. When the rotor is stopped, the blades are subjected to no force other than gravity, and the blade therefore naturally droop downwards under the effect of their weight.

The rotor is thus commonly fitted with an abutment mechanism for limiting the extent to which the blades can move, in particular in flapping, under the effect of forces external to the rotorcraft.

In one embodiment, the abutment mechanism may comprise, for each blade, a bottom abutment member and a top abutment member that form obstacles to the individual flapping movements of the blades respectively downwards and upwards. The abutment mechanism includes bottom and top abutment tracks arranged on a retention and mobility member. For example, one strength member of a spherical abutment carries an abutment pad presenting an abutment track.

In the event of excessive flapping movement of a blade, an abutment track comes into contact with an abutment member, thereby limiting the flapping movement of the blade.

A particular function of the abutment mechanism is to limit the flapping movement of the blades when starting the rotor, and more particularly in the presence of wind. The abutment mechanism may also limit the flapping movement of the blades during an operation of folding the blades. In particular, when spherical abutments are present for hinging a blade to the hub, the abutment mechanism acts on the ground to tend to preserve the spherical abutments by ensuring that flapping movements of blades in the absence of centrifugal force do not lead to delamination of the elements constituting the spherical abutments.

While the rotor is rotating, the top abutment members should not interfere with upward mobility of the blades. The abutment mechanism may then include means for retracting the top abutment members when the rotor is in operation.

The top abutment members are then mounted on the hub to move between two positions. A first position is a position in which the top abutment members engage corresponding abutment tracks, so that when the rotor is stopped, they limit the flapping mobility of the blades between the bottom abutment members and the corresponding top abutment members. A second position is a position in which the top abutment members are disengaged, so that in flight the blades are free to move upwards in flapping.

To summarize, a top abutment mechanism usually includes one abutment member per lift assembly, one abutment track carried by a lift assembly, e.g. by its retention and mobility member, and one retraction means capable of positioning an abutment member in register with an abutment track, when necessary.

Furthermore, the abutment mechanism includes a low abutment ring common to all of the blades. This low abutment ring is movable in a groove.

In flight, only one blade at a time can move downwards, thereby pushing the ring in an opposite direction. The ring therefore does not prevent the lift elements from flapping.

In contrast, on the ground, when stopped or when rotating at low speed, the lift assemblies come simultaneously into contact with the ring, thereby causing them to be mutually prevented from moving.

An abutment mechanism of a blade thus includes a low abutment ring common to all of the lift elements, and, for each lift element, a respective high abutment that is retractable.

Those two abutment systems are independent and lead to a large number of mechanical parts in a space that, by its very nature, is restricted.

Furthermore, the low abutment ring may present weight that is not negligible on a heavy aircraft, and it may generate unbalance that needs to be taken into consideration.

Document FR 2 584 997 describes an abutment system having a central abutment that is common to all of the lift elements. That central element cannot be eclipsed in flight.

Furthermore, the system includes an abutment member arranged on each retention and mobility member. The abutment member rises in elevation over a vertical height that is greater than the height of the central abutment. Under such circumstances, the abutment member includes a top nib and a bottom nib representing flapping limits for the corresponding lift element.

Distantly-related technologies do not make use of abutments, but rather of hooks.

Thus, Document U.S. Pat. No. 2,719,593 describes an aircraft having a plurality of blades hinged to a rotor head in particular via a "drag" hinge. A blade also has a "flapping" link.

For each blade, the aircraft has a flapping retention mechanism for holding the blade in a given position. That mechanism includes a hook connected by vertical arms to the flapping link, being arranged under the head of the rotor. The hook is provided with a weight so that under the effect of centrifugal force it tilts about a horizontal axis of rotation that is hinged to the vertical arms.

The hook is then engaged about a pin of the drag hinge when the rotor is stopped, and it disengages from that orifice when the rotor is set into rotation.

Document FR 2 551 723 describes a blade fastened to a retention and hinge member, the retention and hinge member being connected to two plates of a rotor by a fastener pin.

That document describes a mechanism having an abutment comprising a perforated plate through which said fastener pin passes. The abutment is also secured to a weight for causing it to turn about said pin under the effect of centrifugal forces. That abutment co-operates with a bottom bearing surface of a pitch control yoke of a lift assembly.

Furthermore, the mechanism includes a hook suitable for being engaged in the bottom bearing surface.

Under such circumstances, the mechanism has a pivot abutment and a hook suitable for catching a bottom bearing surface of a pitch control yoke of a lift assembly. That mechanism then tends to replace a high abutment with a hook co-operating with a pitch control yoke.

Document FR 2 447 856 describes a rotor having a plurality of blades.

Each blade has a cuff. The cuff comprises a U-shaped yoke that is hinged to a hub having a plate by means of a retention and hinge member.

Furthermore, an actuator lever is provided for modifying the pitch angle of the blade. Two appendices of the lever are then secured to the yoke.

Each blade is provided with a mechanism for limiting its flapping movement, where appropriate. The mechanism includes a bracket rigidly fastened to the plate, the bracket having a top projection and a bottom projection that acts as abutments.

In addition, the mechanism has a cylindrical element that is movable in a direction that is substantially perpendicular to the axis of rotation of the rotor and parallel to the longitudinal axis of the blade. The cylindrical element is received in an orifice of an appendix of the actuator lever. Each abutment is thus stationary and co-operates with a movable member of an actuator lever.

Also known are Documents FR 2 735 094, GB 2 073 121, and EP 1 371 554.

BRIEF SUMMARY OF THE INVENTION

An object of the present invention is to propose a rotor having a mechanism for limiting the flapping stroke of blades of a main rotor of a rotorcraft.

According to the invention, a rotorcraft rotor has a hub carrying a plurality of lift assemblies, each lift assembly having a retention and mobility member connected to at least one plate of the hub, the rotor having an abutment mechanism for each lift assembly to limit upward and downward flapping movement of the lift assembly under predetermined conditions. Each abutment mechanism of a lift assembly comprises:

- an abutment track arranged on a "rear" face of the retention and mobility member facing an axis of rotation in elevation of the rotor;
- a single cylindrical abutment hinged to at least one plate of said hub by hinge means to be movable solely in pivoting about a movement axis between a "engagement" position in which said flapping movement is limited by the abutment, and a "disengagement" position in which said movement is not limited by the abutment, said abutment extending over a height in elevation along said movement axis and over a length along a "longitudinal" axis that is arranged substantially parallel to the span direction of the lift assembly when in the engagement position, and over a width along a "transverse" axis perpendicular to the movement axis and to the longitudinal axis, said length being greater than said width, said height being greater than said length;
- a fly-weight constrained to pivot with said cylindrical abutment and laterally offset relative to said longitudinal axis when in the engagement position; and
- a return spring exerting a force on the mechanism to tend to position said abutment in the engagement position.

When the rotor is not driven in rotation, the abutment is in the engagement position. In other words, the abutment is facing the abutment track.

For example, the fly-weight extends laterally parallel to the transverse axis.

Since the abutment extends in elevation substantially parallel to the abutment track, this abutment prevents flapping of the lift assembly.

In contrast, it is possible to modify the pitch of the lift assembly. This aspect represents an advantage compared with certain elements of the prior art, and in particular certain devices having hooks engaged in a neck.

In addition, a single abutment makes it possible to prevent the blades from moving with flapping movement not only downwards but also upwards. The height of the abutment makes it possible to block the lift assembly against flapping in two distinct flapping directions. The mechanism can therefore be made lighter than a mechanism that requires two specific abutments, for example.

When the rotor is rotating faster than a threshold speed of rotation, the centrifugal forces exerted cause the fly-weight to pivot about the movement axis. The abutment consequently turns about the movement axis together with the fly-weight.

Since the width of the abutment is less than its length, this turning movement serves to move the abutment away from the retention and mobility member. This greater space provides the lift assembly with freedom to move in flapping.

At the end of this turning movement, the abutment is in a disengagement position. The transverse axis of the abutment is then arranged substantially along the length in which the lift assembly extends, i.e. spanwise. The space between the abutment and the retention and mobility member is then at its maximum. The lift assembly is then free to move in flapping, at least over a range as determined by the manufacturer.

On the rotary movement coming to rest, the centrifugal forces exerted on the fly-weight decrease. The return spring then enables the abutment to be moved into its engagement position.

The mechanism thus provides a single abutment having one degree of freedom to move in pivoting in order to be moved between an engagement position and a disengagement position. The single abutment thus presents the advantage of reaching a disengagement position, in contrast with a device having a stationary abutment.

The mechanism is relatively simple. Under such circumstances, the mechanism may be arranged on a rotor in a space that is relatively restricted, and/or may possess small weight.

The rotor may also include one or more of the following additional characteristics.

For example, the retention and mobility member may be a laminated abutment, and in particular a spherical abutment.

Such a laminated abutment comprises a succession of rigid layers and of flexible layers. A flexible layer may in particular be made of elastomer. Reference may be made to the literature in order to obtain a detailed description of such an abutment.

Furthermore, the rear face extends over an "elevation" distance along an axis parallel to the movement axis, and this elevation distance is optionally less than or equal to said height of the abutment.

This characteristic seeks to optimize blocking of the blade in flapping by minimizing the freedom to move in flapping of the lift assembly.

In addition, the mechanism includes longitudinal clearance between the abutment track and the abutment in the engagement position.

This clearance, which is non-zero and may for example lie in the range one millimeter to two millimeters, serves to leave freedom of movement for the lift assembly, in particular lead/lag movement.

In an embodiment, the rear face of the retention and mobility member represents the abutment track. Optionally, a protective deposit may be applied to said rear face.

In an alternative, the abutment track includes a removable wear member reversibly fastened to the rear face. The wear member may comprise a wear sheet that is adhesively bonded or screwed to the rear face.

Furthermore, the hinge means may comprise a tube secured to the abutment, the tube being hinged to at least one plate of the hub. The abutment is thus secured to a tube hinged to the at least one plate of the hub in order to be free to perform pivoting movement. The tube thus extends in elevation along the movement axis.

By way of example, ball or roller type bearing means are interposed between the tube and each of the plates through which the tube passes.

In an embodiment, the tube passes through a top plate and a bottom plate of the hub.

With a hub that has a single plate, the tube may be hinged to the hub via a rigid part constituting a bracket, for example.

Independently of the way in which the hub is embodied, the fly-weight may then be secured to the tube, in particular at one end of the tube.

Furthermore, the return spring may extend between the fly-weight and a plate of the hub.

In addition, the abutment may comprise a cylindrical body having a "rear" portion and a "front" portion respectively facing the axis of rotation and the abutment track when in the engagement position, the front portion having a base with a periphery that is rounded in part.

This rounded periphery can facilitate disengaging the abutment.

Where appropriate, the rear portion may pass a tube of the hinge means.

The front portion may in particular include a semicircular base.

Furthermore, when the hub includes a bottom plate and a top plate, and said abutment is favorably arranged between the bottom plate and the top plate. The overall size of the mechanism and thus of the rotor is minimized.

The fly-weight may then optionally be arranged below the bottom plate and/or above the top plate. The fly-weight may thus be placed below the bottom plate or above the top plate, or it may be split into a first fly-weight arranged below the bottom plate and a second fly-weight placed above the top plate.

When the hub has a single plate with recesses receiving the retention and mobility members, each abutment may pass through one of the recesses of the plate.

In addition to a rotor, the invention provides a rotorcraft having such a rotor.

BRIEF DESCRIPTION OF THE SEVERAL VIEWS OF THE DRAWINGS

The invention and its advantages appear in greater detail from the following description of embodiments given by way of illustration and with reference to the accompanying figures, in which:

FIGS. 5 and 6 are views explaining the operation of the mechanism.

Elements present in more than one of the figures are given the same references in each of them.

DETAILED DESCRIPTION OF THE INVENTION

Figure 1:
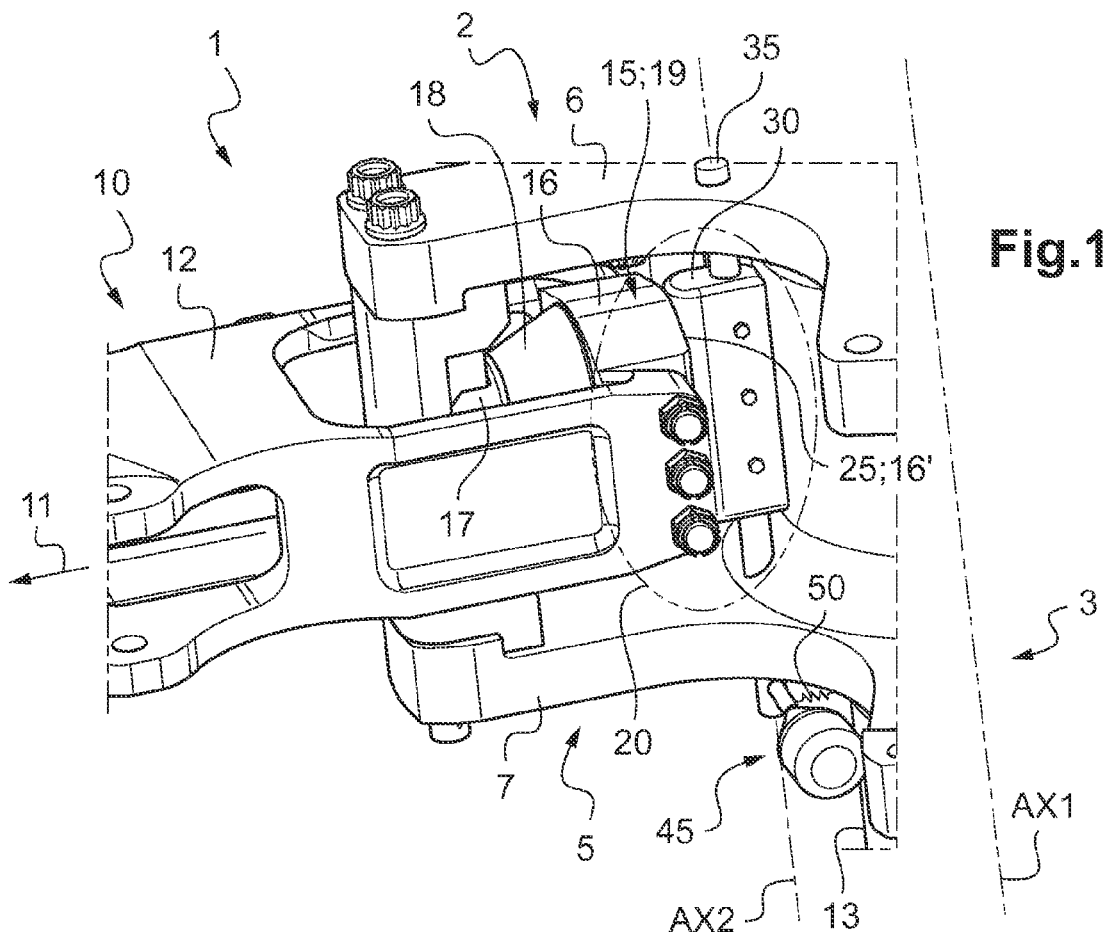
FIG. 1 is a view of a rotor having a two-plate hub provided with a mechanism of the invention.

FIG. 1 shows a rotorcraft 1 having a rotor 2. The rotorcraft 1 and the rotor 2 are shown in part only, in order to avoid overburdening FIG. 1.

The rotor 2 is provided with a hub 5 secured to a rotor mast 3 that is rotatable about an axis of rotation AX1. The hub 5 possesses at least one plate for carrying a plurality of lift assemblies 10.

The embodiment of FIG. 1 presents a hub having a top plate 6 and a bottom plate 7 defining in elevation a space suitable for receiving the lift assemblies 10 in part.

Figure 2:
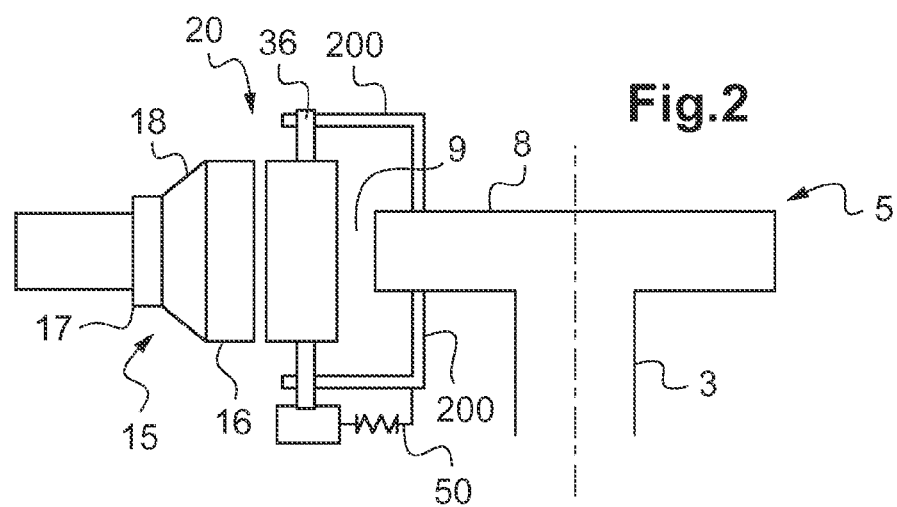
FIG. 2 is a diagram showing a rotor having a one-plate hub provided with a mechanism of the invention.

The embodiment of FIG. 2 shows a hub having a plate 8 provided with recesses 9 capable of receiving the lift assemblies 10 in part.

Independently of the embodiment, and with reference to FIG. 1, each lift assembly 10 may comprise a lift element 11 and a cuff 12 incorporated in the lift element or fastened to the lift element 11. The cuff constitutes the member enabling the lift element to be fastened to a retention and mobility member 15 secured to the hub 5.

Such a retention and mobility member 15 may comprise a laminated abutment 19. The retention and mobility member 15 may then for example be provided with an "outer" strength member 16 and an "inner" strength member 17 fastened to at least one plate of the hub, and a laminated member 18 connecting the outer strength member 16 to the inner strength member 17. The outer strength member 16 then possesses a "rear" face facing towards the axis of rotation AX1 and a "front" face that is fastened to the laminated member 18.

Such a retention and mobility member enables a lift element to be hinged about an axis for flapping movement, an axis for pitch movement, and an axis for lead/lag movement, for example.

Furthermore, the rotor 2 is provided with a mechanism 20 for each lift assembly in order at least to limit the flapping movement of the lift assembly during predetermined stages. In particular, the mechanism is active for limiting this flapping movement below a threshold speed of rotation of the rotor. Consequently, for each blade, the rotor 2 has a single mechanism 20.

An abutment mechanism 20 thus includes an abutment track 25 arranged on the rear face 16' of the retention and mobility member 15.

In the embodiment of FIG. 1, this rear face 16' represents the abutment track. The rear face may possibly be covered in a protective deposit.

Figure 3:
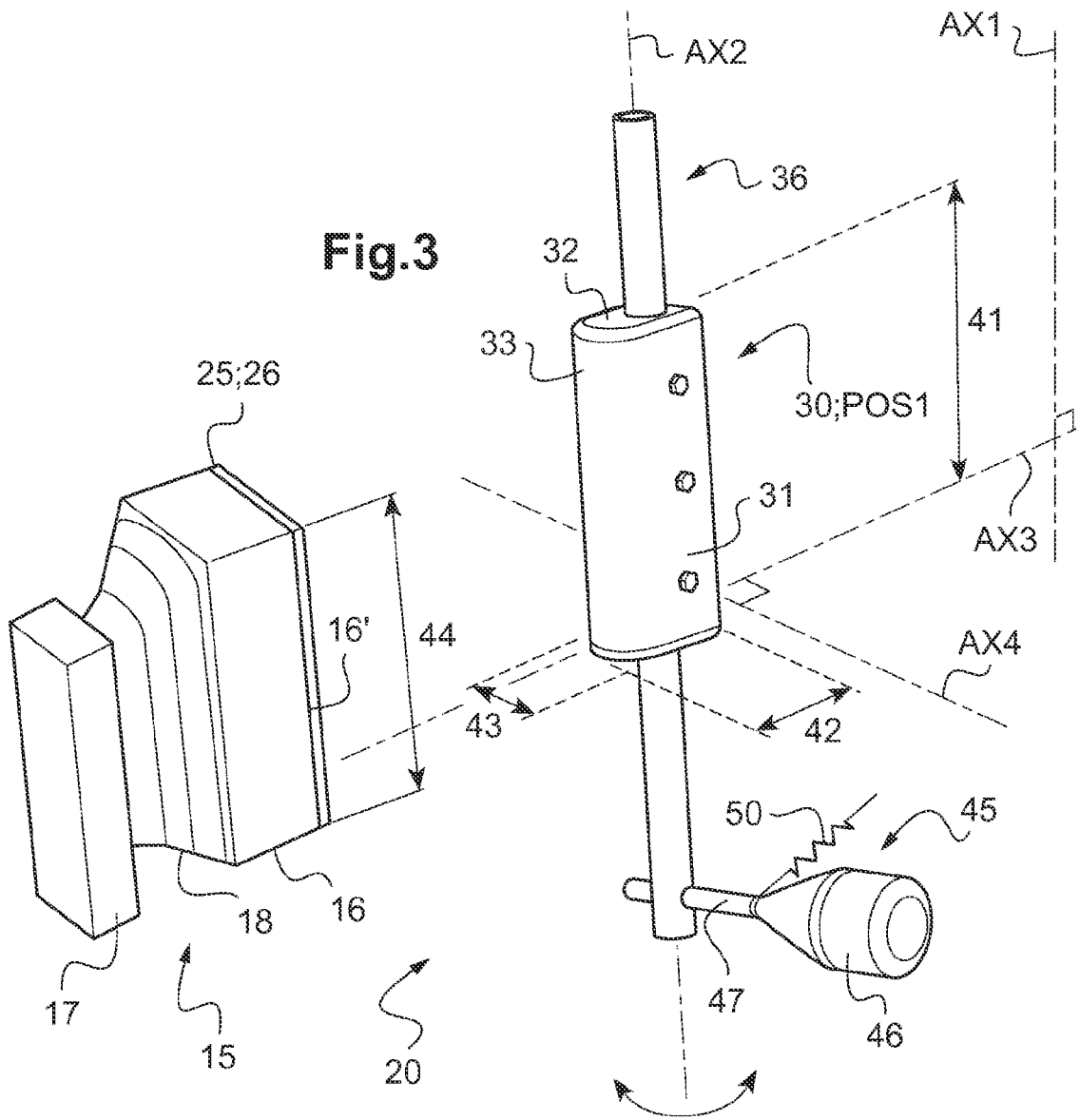
FIG. 3 is an exploded view of such a mechanism.

In the embodiment of FIG. 3, the mechanism comprises a wear member 26, e.g. a sheet. This wear member is then fastened reversibly to the retention and mobility member in order to cover the rear face 16'.

With reference to FIG. 1, a mechanism 20 also includes a single abutment 30 for interfering by shape interference with the abutment track 25 in order at least to limit flapping of the lift assembly.

This single abutment 30 is also movable in pivoting about a movement axis AX2 in order to be retractable. In a position referred to for convenience as the "engagement" position, the abutment 30 can block any flapping movement by abutting against the abutment track 25. Consequently, for each blade, the rotor 2 has a single mechanism 20, with this single mechanism 20 having a single abutment 30 for limiting the upward and downward flapping movement of the lift assembly under predetermined conditions.

Conversely, the abutment 30 may be turned so as to be put into a position referred to for convenience as the "disengaged" position. In the disengaged position, the abutment is no longer in a position to block any flapping movement because it is spaced apart from the abutment track 25.

Furthermore, the mechanism includes a fly-weight 45 for controlling pivoting of the abutment 30. As a function of the speed of rotation of the rotor, centrifugal force acts on the fly-weight, thereby causing the abutment 30 to turn.

In addition, the mechanism includes a return spring 50 extending between the fly-weight 45 and the hub 5. The return spring tends to position the fly-weight and the abutment in the engagement position.

FIG. 3 is an exploded view of the mechanism 20.

The abutment 30 is an abutment that is cylindrical. The term "cylindrical" is used of an abutment to indicate that it has the shape of a cylinder, namely a volume obtained by sweeping a generator line around the periphery of a base.

Figure 4:
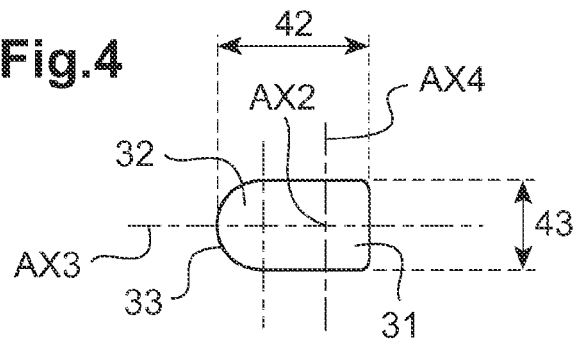
FIG. 4 is a section view of an abutment.

With reference to FIG. 4, the cylindrical abutment may be subdivided into a rear cylindrical portion 31 adjacent to a front cylindrical portion 32. In the engagement position shown diagrammatically in FIG. 3, the rear portion faces the axis of rotation AX1 while the front portion 32 faces the retention and mobility member 15.

The base of the rear portion 31 may be rectangular, or it may match the shape of a surface of the hub, for example.

The base of the front portion may possess a rounded periphery, e.g. being semicircular.

With reference to FIG. 3, the cylindrical abutment extends in elevation along the movement axis AX2 over a height 41. This movement axis may for example be parallel to the axis of rotation AX1 of the rotor.

Furthermore, the cylindrical abutment extends lengthwise along a longitudinal axis AX3 over a length 42. This longitudinal axis AX3 may for example be orthogonal to the movement axis AX2, regardless of the position of the abutment 30. In contrast, the longitudinal axis AX2 may optionally be orthogonal to the axis of rotation and/or parallel to the axis in which the lift assembly extends spanwise when the abutment 30 is in the engagement position POS1 as shown in FIG. 3.

The cylindrical abutment extends widthwise along a transverse axis AX4 over a width 43. This transverse axis AX4 is for example orthogonal to the movement axis AX2 and to the longitudinal axis, regardless of the position of the abutment. In contrast, the transverse axis AX4 is optionally orthogonal to the axis of rotation and/or parallel to a span axis of the lift assembly when the abutment 30 is in the disengagement position.

Under such circumstances, the height 41 of the abutment 30 is greater than its length 42, which length 42 is greater than its width 43.

Furthermore, the rear face 16' extends over a distance 44 in elevation along an axis parallel to the movement axis AX2, with this distance 44 in elevation being less than or equal to the height 41 of the abutment.

The mechanism then has hinge means 35 in order to enable the abutment to pivot relative to the hub.

The hinge means may comprise a tube 36 hinged directly or indirectly to at least one of the plates of the hub. The tube 36 possibly passes right through the abutment 30, e.g. through its rear portion 31.

The tube 36 may also carry the fly-weight 45. The fly-weight is offset laterally relative to the abutment 30.

The fly-weight may thus comprise a heavy element 46 connected to the tube 36 by a rod 47. The term "heavy element" designates a member of mass that is much greater than that of the other members of the fly-weight.

By way of example, the rod 47 extends parallel to the transverse axis AX4, and thus orthogonally to the movement axis AX2. In the engagement position, the fly-weight thus extends at an angle of 90° relative to the lift assembly, and is substantially parallel with the lift assembly in the disengagement position.

The return spring may then be connected for example to the rod 47 of the fly-weight and also to a plate of the hub.

In FIG. 1, the tube is fastened by conventional members to both plates of the hub, these members giving the tube a degree of freedom to move in pivoting about the movement axis AX2.

The abutment is then arranged between the top plate 6 and the bottom plate 7. In contrast, the fly-weight may for example be positioned beneath the bottom plate 7.

In FIG. 2, the abutment is arranged in a recess 9 in a hub having a single plate 8. By way of example, the tube 36 is connected to the plate 8 by two arms 200 extending on opposite sides of the plate 8. One of the arms is thus situated above the plate 8 while the other arm is situated under the plate 8.

FIGS. 5 and 6 show the operation of the abutment. Although this operation is shown with a hub that has two plates, the operation that is described applies equally well to a hub having only one plate.

With reference to FIG. 5, the abutment is in the engagement position POS1 when the hub is not rotating. A small amount of clearance 100 might possibly lie between the front portion 32 of the abutment and the abutment track 25. It can be understood that flapping movement of the lift assembly relative to the flapping axis AX5, as represented by double-headed arrow F1, is then not possible.

When the rotor is set in rotation, centrifugal force acts on the fly-weight 45 in the direction of arrow F2 and causes the fly-weight to turn in the direction represented by arrow F3.

The fly-weight and the abutment then turn about the movement axis AX2. The clearance 100 then increases given the particular shape of the abutment 30.

As from a threshold, the fly-weight 45 is directed along a radius of the rotor, i.e. substantially along an axis along which the lift assembly extends. Turning of the abutment is then complete. The abutment 30 is then in the disengagement position POS2, in which the clearance 100 is maximized.

This clearance 100 serves to guarantee that there is no interference between the abutment and the retention and mobility member by maintaining some minimum amount of clearance even during flapping of the lift assembly.

When the rotor is stopped, a return to the engagement position is made possible by the return spring 50.

Furthermore, it should be observed that for maintenance actions, the fly-weight enables action to be taken manually on the abutment 30 in order to release movements of the blade.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A rotor for a rotorcraft, the rotor having a hub carrying a plurality of lift assemblies, the hub having at least one plate, each lift assembly having a retention and mobility member connected to the at least one plate of the hub, the rotor having a single abutment mechanism for each lift assembly to limit upward and downward flapping movement of the lift assembly, wherein each abutment mechanism for a lift assembly comprises:

an abutment track arranged on a rear face of the retention and mobility member facing an axis of rotation in elevation of the rotor;

a single cylindrical abutment hinged to the at least one plate of the hub by hinge means to be movable solely in pivoting about a movement axis between an engagement position in which the flapping movement is limited by shape interference between the cylindrical abutment and the abutment track under at least one predetermined condition, and a disengagement position in which the movement is not limited by the cylindrical abutment, the cylindrical abutment extending over a height in elevation along said movement axis and over a length along a longitudinal axis that is arranged substantially parallel to a span direction of the lift assembly when in the engagement position, and over a width along a transverse axis perpendicular to the movement axis and to the longitudinal axis, the length being greater than the width, the height being greater than the length;

a fly-weight constrained to pivot with the cylindrical abutment and laterally offset relative to the longitudinal axis when in the engagement position; and a return spring exerting a force on the abutment mechanism to tend to position the cylindrical abutment in the engagement position.

2. A rotor according to claim 1, wherein the retention and mobility member is a laminated abutment.

3. A rotor according to claim 1, wherein the rear face extends over an elevation distance along an axis parallel to the movement axis, and the elevation distance is less than or equal to the height of the cylindrical abutment.

4. A rotor according to claim 1, wherein the abutment mechanism includes longitudinal clearance between the abutment track and the abutment in the engagement position.

5. A rotor according to claim 1, wherein the rear face represents the abutment track.

6. A rotor according to claim 1, wherein the abutment track includes a removable wear member removably fastened to the rear face.

7. A rotor according to claim 1, wherein the hinge means comprise a tube secured to the cylindrical abutment, the tube being hinged to the at least one plate of the hub.

8. A rotor according to claim 7, wherein the fly-weight is secured to the tube.

9. A rotor according to claim 1, wherein the return spring extends between the fly-weight and the at least one plate of the hub.

10. A rotor according to claim 1, wherein the cylindrical abutment comprises a cylindrical body having a rear portion adjacent to a front portion respectively facing the axis of rotation and the abutment track when in the engagement position, the front portion having a base with a periphery that is rounded in part.

11. A rotor according to claim 10, wherein the front portion has a semicircular base.

12. A rotor according to claim 1, wherein the at least one plate of the hub includes a bottom plate and a top plate, and the cylindrical abutment is arranged between the bottom plate and the top plate.

13. A rotor according to claim 12, wherein the fly-weight is arranged under the bottom plate and/or over the top plate.

14. A rotorcraft, wherein the rotorcraft includes a rotor according to claim 1.

15. A rotor according to claim 1, wherein the movement axis of the cylindrical abutment is parallel to the axis of rotation of the rotor.

16. A rotor for a rotorcraft comprising:
a hub having a plate;
a lift assembly;
a retention and mobility member connecting the lift assembly to the plate of the hub; and
a single abutment mechanism comprising:

an abutment track arranged on a rear face of the retention and mobility member, the abutment track facing an axis of rotation of the rotor, a single cylindrical abutment element connected to the plate of the hub by a hinge for movement solely in pivoting about a movement axis between an engagement position and a disengagement position, the abutment element extending from an upper distal end to a lower distal end along the movement axis to define a height of the abutment element therebetween, the abutment element extending from a front portion to a rear portion along a longitudinal axis to define a length therebetween, the longitudinal axis being parallel to a span direction of the lift assembly when in the engagement position, and the abutment element extending between two opposed side faces along a transverse axis perpendicular to the movement axis and to the longitudinal axis to define a width therebetween, wherein the length is greater than the width, and the height is greater than the length, a fly-weight connected to and constrained to pivot with the abutment element, the fly-weight being laterally offset relative to the longitudinal axis when in the engagement position, the fly-weight configured to tend to position the abutment element in the disengagement position in response to rotation of the rotor, and a return spring exerting a force on the abutment mechanism to tend to position the abutment element in the engagement position, wherein the front portion of the abutment element is configured to contact the abutment track in the engagement position to limit upward and downward flapping movement of the lift assembly, and wherein the abutment element in the disengagement position is configured to not limit flapping movement of the lift assembly.

17. A rotor according to claim 16, wherein the movement axis of the abutment element is parallel with the axis of rotation of the rotor.

18. A rotor according to claim 16, wherein the front portion of the abutment element has a rounded periphery.

19. A rotor according to claim 16, wherein the plate of the hub is an upper plate;

wherein the hub has a lower plate, the retention and mobility member connecting the lift assembly to the lower plate of the hub, and the single abutment element connected to the upper plate of the hub by the hinge; and wherein the abutment element is positioned between the upper and lower plates.

20. A rotor according to claim 16, wherein the abutment element is positioned between the retention and mobility member and the axis of rotation of the rotor.

* * * * *